May 15, 1951     A. A. WALSH ET AL     2,553,223
INTERVALOMETER
Filed March 18, 1946     2 Sheets-Sheet 1
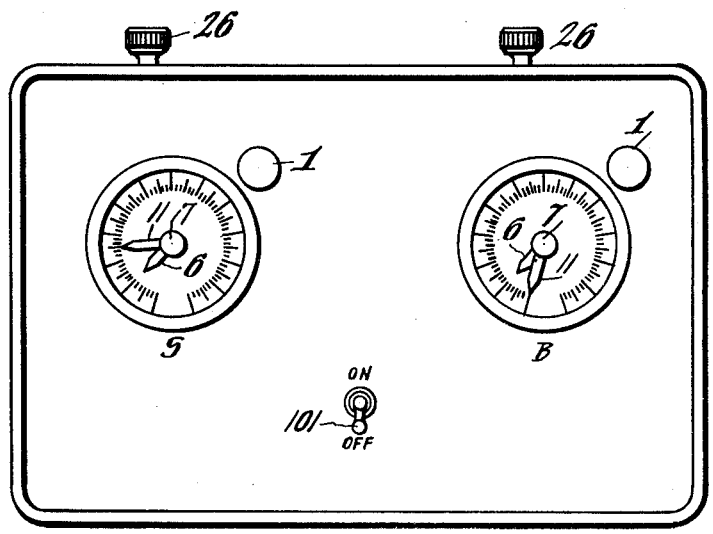
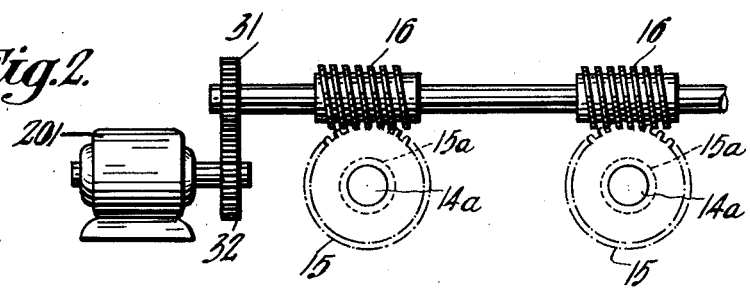
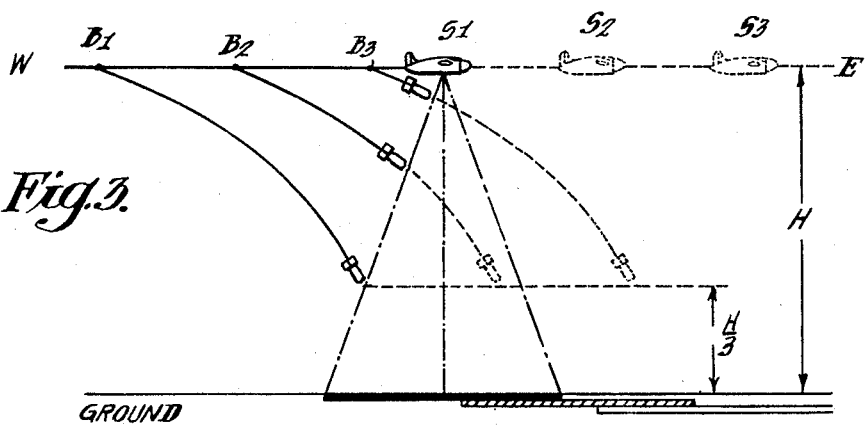
INVENTORS
ALLEN A. WALSH
& GRANVILLE C. PEERS
BY
ATTORNEY

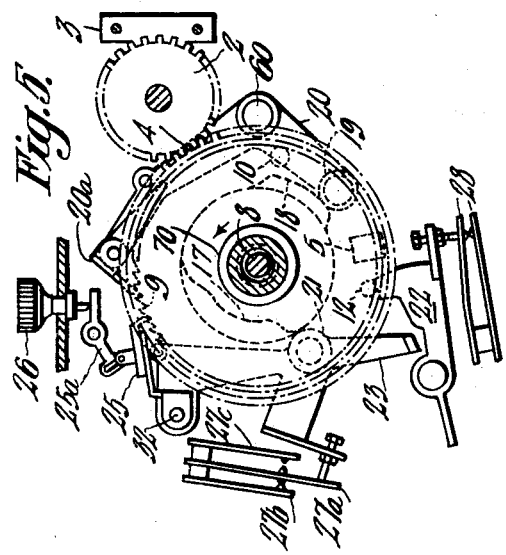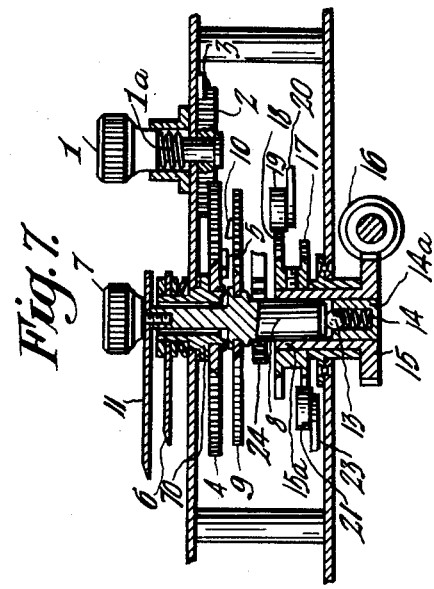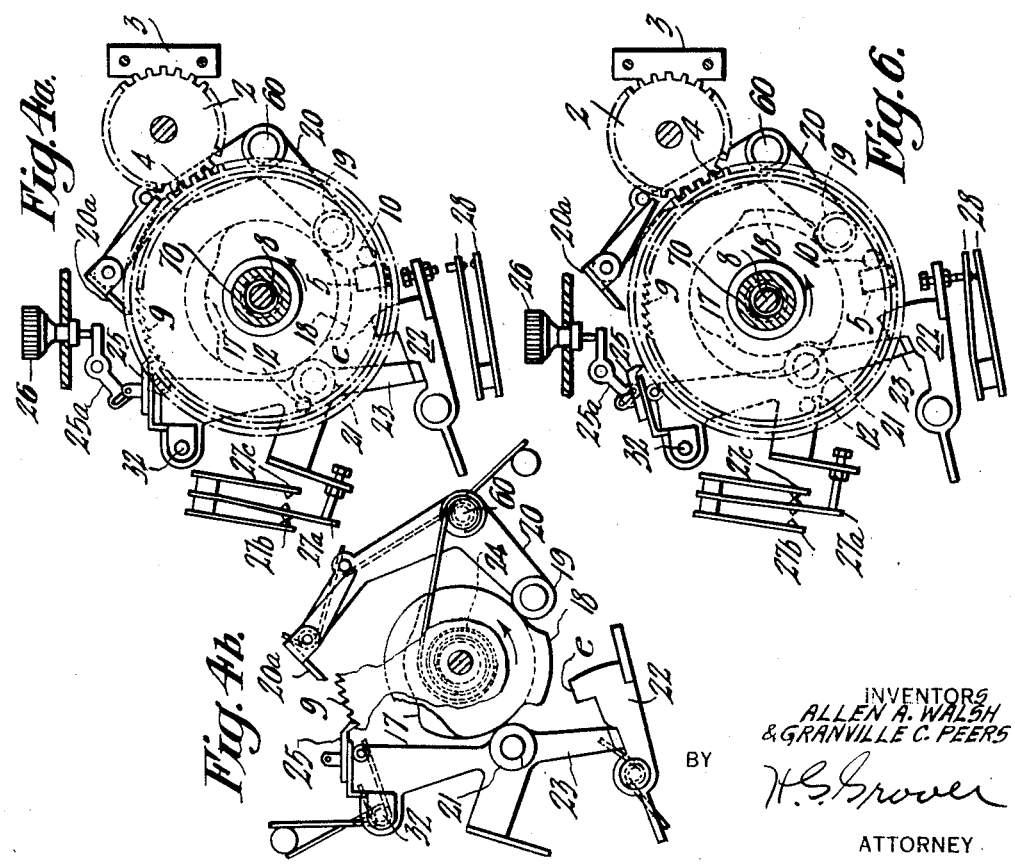

Patented May 15, 1951

2,553,223

UNITED STATES PATENT OFFICE 2,553,223

INTERVALOMETER

Allen A. Walsh, West Englewood, N. J., and Granville C. Peers, St. Albans, N. Y., assignors to Radio Corporation of America, a corporation of Delaware Application March 18, 1946, Serial No. 655,336

7 Claims. (Cl. 161—1)

This invention relates to intervalometers, or instruments for measuring fixed time intervals and for actuating devices periodically. There are many operations in the fabrication of materials, the performance of chemical or other process steps, and in miscellaneous fields of endeavor which have to be performed at predetermined fixed time intervals. The utility of an intervalometer is, therefore, easily understood. In some applications, however, it is necessary to perform a series of operations with fixed periods of time delay subsequent to other operations which may relate to a different set of functions. To give an example, it has been found that in making maps by aerial photography at night it is necessary to drop a photoflash bomb at a certain period prior to the opening of the camera shutter so that the shutter operation will be timed to coincide with the illumination of the landscape by the photoflash bomb when the latter is exploded. Situations are also met where more than two functions are needed to be performed in timed sequence and periodically, and in such cases the apparatus of our invention is found to have still further utility.

Accordingly, it is an object of our invention to provide a combination of cooperative intervalometers which may be useful in controlling periodically and concurrently a plurality of devices whose cycles of operation must be maintained in fixed phase relation one to another.

Another object of our invention is to modify existing intervalometer apparatus in such a way as to delay the start of the first timing interval for a period which may be either greater or less than the period of each subsequently measured time interval.

Again it is an object of our invention to provide apparatus for measuring time intervals in a plurality of concurrent series, where the intervals of one series bear a fixed ratio to those of another series, a low integer being usually chosen as the ratio.

A still further object of our invention is to provide an instrument of the class described which is suitable for initiating a plurality of different functions and for repeating their performance periodically and in fixed phase relation one to another.

Our invention will now be described in more detail, reference being made to the accompanying drawings in which:

Fig. 1 shows a front elevation view of apparatus which includes two intervalometer units, these being adapted to control different functions in a predetermined phase relation one to the other, but at fixed time intervals;

Fig. 2 shows a transmission gear train whereby each of two intervalometers is provided with a common motor drive.

Fig. 3 shows diagrammatically how the apparatus of our invention may be used for purposes of aerial photographic mapping;

Fig. 4a shows one of the apparatus units of an intervalometer as it would appear with its dial and hands removed;

Fig. 4b shows certain details of the intervalometer unit the same as in Fig. 4a but with certain of the gear elements broken away so that its lever systems may be more clearly viewed;

Fig. 5 shows a view similar to that of Fig. 4a but with the lever systems differently positioned, as at a different stage of operation;

Fig. 6 shows still another view similar to that of Fig. 4a but with the elements still further advanced in their cyclic operation; and Fig. 7 is a side elevation view looking through the "works" of the intervalometer unit edgewise and showing the gears and cams.

The two intervalometer units shown in Fig. 1 are alike in every respect, and they are driven synchronously by means of a transmission such as the worm-and-gear drive shown in Fig. 2. Each of the intervalometer units is actuated from its own worm gear 15 which is fixedly mounted on a sleeve 15a or is formed integrally therewith. The worm 16 appears in Figs. 2 and 7. A cam 18 is mounted on the sleeve portion 15a. With it a cam follower roller 19 cooperates for the purpose of actuating a pawl mechanism mounted on a lever 20. The pawl 20a engages with the teeth of a ratchet wheel 9 and advances this wheel one step counter-clockwise with each revolution of the cam 18. In one case where our intervalometer system has been successfully used the cams 17 and 18 were rotated at a speed of 60 R. P. M. thus advancing the ratchet wheel 9 at the rate of one tooth per second.

The pawl 20a is movable by means of the cam 18 and cam follower 19 between a position where it is free from the ratchet teeth of the wheel 9 and a position where it has advanced the wheel 9 through the arc of one tooth. Normally, however, the pawl 20a stands free from the ratchet wheel so that the latter can be released for clockwise rotation by means of a clock spring 24. This spring is attached to the shaft 8 and its outer end is anchored onto a stud 69 which also serves as the pivot for the lever arm 20.

A pointer-carrying sleeve 70 slips freely on a portion of the shaft 8 of reduced diameter. It carries the pointer 6 and also a gear 4. These elements are settable to a position which determines the duration of the interval to be cyclically measured by the intervalometer. The setting of the pointer 6 is accomplished by means of a knob 1 which must first be depressed against the force of a coiled spring 1a in order to throw the gear 2 out of mesh with a fixed rack-plate 3. Gear 2 meshes at all times with the gear 4.

A stop lug 5 is mounted on the under side of the gear 4 and serves to arrest the ratchet wheel 9 when it is released by a holding pawl 25. The intervalometer, when cyclically operated under control of the motor 201, causes the cams 17 and 18 to rotate counterclockwise to a position such that a pin 12 shall bear against the edge e of a lever 22 thereby disengaging the end of a lever 23 for movement of its cam follower 21 against the periphery of cam 17. On the next following revolution of the cam 17 lever 23 is permitted to rotate on its pivot center 32, thus withdrawing the holding pawl 25 from engagement with the ratchet wheel 9.

At that instant ratchet wheel 9 is returned clockwise to a position of arrest with the stop members 10 and 5 in abutment.

In the preceding paragraph the reason will be apparent for setting the stop member 5 at different points of orientation in order to determine the time interval to be periodically measured. Before starting the cycle of operation of the intervalometer, however, it is sometimes necessary to delay the commencement time of the fixed interval by a period greater than that interval. Accordingly, it is a feature of our invention to provide means for so doing. The knob 7 at the front end of the shaft 8 is depressable along with the shaft 8 (and all of the elements mounted thereon) for causing the stop member 10 to be rotated clockwise without interference from the stop member 5. The pointer 11 can then be set to any position over the dial for indicating the initial time interval which is to precede the starting of the fixed periodic time interval.

It will be observed that the stop member 10 (as shown in Fig. 7) has a sloping end surface so that as the ratchet wheel 9 is advanced tooth by tooth the stop member 10 will be free to turn past the fixed stop member 5 when moving in a counter-clockwise direction. When the holding pawl 25 is lifted for disengaging the ratchet wheel 9, the return movement in a clockwise direction is limited by the abutment between the two stop members 10 and 5. Thus it will be seen that the initial time delay period is determined by the setting of the pointer 11, and subsequent time intervals are measured in accordance with the setting of the pointer 6.

A switch 101 (Fig. 1) is disposed in the power supply circuit for the motor 201 (Fig. 2). This circuit is not shown in the drawing, but it will be understood that the initial delay period for starting the cyclic operation of each intervalometer unit commences with the closure of the motor switch 101.

In setting the pointer 11 to a given position for measuring the initial delay period it may occasionally be necessary not only to depress the knob 7 so that the projection 10 may sweep under the stop member 5, but if the rotation of the knob 7 is to be made clockwise then it may be necessary to disengage the pawl 25 from the ratchet wheel 9. This is accomplished by depressing a push button 26 which is mechanically linked through a lever member 25a to the pawl 25 and lifts the pawl out of engagement.

During normal operation of the intervalometer units, successive steps of operation by the motor drive are represented by Figs. 4a or 4b, Fig. 5 and Fig. 6. Fig. 4a shows the projection 10 fully restored by the spring 24 to a point where it rests against the stop 5. This is the start of the periodic timing cycle. The stepwise advancement of the ratchet wheel 9 by successive revolutions of the cam 18 brings the projection 10 around to a position such as shown in Fig. 5 where the stud 12 engages with the lever member 22 and actuates the same for the purpose of releasing the lever member 23. Lever 23 is then made ready to engage its cam follower 21 with the periphery of cam 17. A subsequent revolution of this cam causes the contact 27a to move toward contact 27c and to break contact with its associated contact spring 27b.

The movement of lever 23 as described in the preceding paragraph causes the pawl 25 to be lifted out of engagement with ratchet wheel 9, thus allowing this ratchet wheel and its associated members to be returned to the starting position as shown in Fig. 4a. The tripping position, however, is shown in Fig. 6.

The intervalometer as shown in the various figures of the drawing is capable of closing and/or opening a plurality of independent circuits. One of these circuits may be considered useful to actuate a warning signal in advance of the other and this may be considered useful for performing a primary function of any sort. The warning signal may be actuated by closure of the contacts 28 and the function-performing circuit, and may be controlled by shifting the contact 27a from closure with contact 27b to closure with contact 27c.

The range of applications of our invention is considerably extended by providing a common transmission drive for a plurality of intervalometer units.

The utility of the dual type intervalometer such as shown in Fig. 1 may best be understood by describing a specific application thereof. Let it be assumed, therefore, that the functions to be performed by circuit closures involve the release of a photoflash bomb from a plane flying at a certain altitude and carrying a camera which is to take pictures at periodic intervals, say 10 seconds apart. Fig. 3 illustrates the problems involved. The plane which carries the bombs and the camera, together with radio apparatus of special type, may be presumed to fly at an altitude H. The intervalometer B (Fig. 1) is set to measure successive time intervals of 10 seconds each starting immediately upon the starting of the motor. Zero time is indicated by setting the pointer 11 at the zero point for the initial period. Successive 10-second time intervals are obtained by setting the pointer 6 on the 10-second mark.

The plane while flying in a direction from west to east (as shown in Fig. 3) releases a flash bomb at the point $B_1$ in response to the circuit closure between contacts 27a and 27c of intervalometer B. Ten seconds later a second bomb is released at the point $B_2$. After another 10-second time interval a third bomb is released at point $B_3$.

In practice the photoflash bombs are equipped with fuses which, after a certain delay period, are rendered susceptible to detonation by means of a radio signal sent out from a transmitter carried aboard the plane. This radio signal precedes the opening of the camera shutter by a very brief lapse of time. A certain delay period may be introduced into the shutter operation by means other than the apparatus herein disclosed in order to produce exact synchronization of the shutter opening with the moment of maximum light intensity which follows the detonation of the flashbomb. A time delay device is also used in the bomb for preventing its detonation until after it has fallen nearly to the level of intended detonation. Thus bombs which are subsequently dropped and have not reached that level are rendered immune to detonation by the radio signal. It has been found in practice that the optimum lighting conditions normally exist when the explosions are produced at approximately one-third of the height of the plane.

The first picture to be taken in a series may be that which covers an area shown in Fig. 3 by the heavy black line extending along the ground. This picture is taken from point $S_1$ which is reached by the plane at, say 25 seconds after releasing the first bomb from the point $B_1$. Accordingly, the intervalometer unit S has its initial time interval set to 25 seconds as shown by the position of the pointer 11. The pointer 6 is set for 10-second intervals to actuate the camera shutter and the radio impulse transmitter.

It will be clear from the above that the two intervalometer units B and S may be used respectively for releasing successive bombs at 10-second intervals and for camera shutter actuation along with radio impulse transmission at other 10-second intervals such as to accurately synchronize the shutter openings with the detonations of successive bombs. The time relation between corresponding circuit closures made by intervalometers B and S is maintained at 25 seconds delay for S compared with B. The second picture may, if desired, overlap the first by an appreciable amount, as shown by the overlapping zones of ground coverage in Fig. 3. That is to say, the second picture represented by a cross-hatched area overlaps the first picture by a certain amount and an equal overlap exists between the third picture and the second, the third picture being indicated by a double line.

It will be understood by those skilled in the art that various modifications of our invention may be made without departing from the spirit and scope of the invention itself.

We claim:

1. In an intervalometer of the class described, wherein a time delay switch is to be periodically operated under control of a continuously driven motor, and wherein the initial one of a series of switch operations is to be delayed for a predetermined longer or shorter period after the starting of the motor as compared with the time interval of periodic switch operations in the series, a rotatable shaft linked to said motor, a cam coupled for rotation with said shaft, a cam follower engaging said cam, a lever attached to said cam follower, a rotatable ratchet member on which is mounted a stop-lug, a pre-settable indexing device arranged to cooperate with said stop-lug for determining the homing position of said ratchet member, means cyclically driven by said motor and including a pawl mounted on said lever for rotating said ratchet member step-by-step away from its homing position, lever means and a detent operable by said ratchet member for causing its release and subsequent return to said homing position, a spring for effecting said return, a switch actuator controlled by said lever means at the moment of release of said ratchet member, and manually adjustable means for angularly setting said stop-lug forward or backward with respect to said pre-settable indexing device.

2. In an intervalometer for performing one function in fixed time relation to a second function, and for repeating the performance of both functions periodically, a time interval measuring device having manually adjustable means for predetermining the time interval to be repeatedly measured, a source of power for driving the device at a constant rate, a rotatable shaft, manually adjustable means linked with said rotatable shaft for establishing said fixed time relation between the repeated performances of the two said functions, and means operable to delay the start of a timing cycle of said device for a longer period, measured from the starting time of application of the driving power, than the time interval which is to be repeatedly measured.

3. Apparatus according to claim 2 in which said means for delaying the start of the timing cycle of said device comprises a stop lug having a sloping end surface and being supported by a wheel, said wheel being arranged and adapted for stepwise rotation in one direction when driven by said source of power, and for spring-driven rotation in the other direction when released, a bumper lug orientable to a normally fixed position for arresting said stop lug upon release thereof, and means including said sloping end surface on said stop lug for causing said stop lug to by-pass said bumper lug while selecting a desired delay time interval for the start of the periodic timing cycle.

4. In an intervalometer for periodically actuating an electric switch, the combination of a ratchet-and-pawl mechanism for turning a shaft through a predetermined arc, two lever systems each having manual means for setting to a position which determines the duration of the interval to be cyclically measured by each system, one of said systems serving, for actuating said mechanism, and the other serving for timing the operation of said switch, an electric motor, a rotatable drive shaft linked to said motor, a pair of worm gears on said rotatable drive shaft, motor-driven cams coupled to be rotated by said worm gears at constant speed for so controlling said lever systems that the pawl is caused to drive the ratchet step-by-step and said switch is caused to be operated when said shaft has been turned through said predetermined arc, said other lever mechanism having means associated therewith and controlled by a stud on said ratchet for first restraining and then releasing said other lever mechanism to be cam-controlled, a detent normally engaged with said ratchet, a spring for returning said ratchet to a homing position upon release by said detent, means for suitably mounting said detent on said other lever system so as to effect a release of said ratchet for spring-driven return thereof to a homing position simultaneously with the operation of said switch, means for variably adjusting the arcuate range of travel of said ratchet between successive switching moments, and means for causing the first of a series of switch operations to take place after a delay period which is adjusted to a greater or lesser period than is fixed for measuring subsequent cycles of switch operation.

5. In an intervalometer for periodically initiating the performance of a plurality of functions, each in fixed time relation to the other, a separate measuring device with means for adjusting and controlling the time of performance of each function, a source of driving power coupled by a worm gear having a shaft common to the several devices for driving the same at a constant rate, each device having a cam coupled for rotation with said shaft, a cam follower engaging said cam, a lever attached to said cam follower, a cam-controlled pawl-and-ratchet mechanism having a pawl secured to said lever and driven by said source of power for progressive actuation of each said measuring device in a forward direction, self-releasing means for restoring each said measuring device to a condition for commencing its cycle of fixed interval time measurement, two wheel-mounted lugs in each device one lug being settably interposed in the path of the other, said wheel-mounted lugs arranged to rotate with said cam, whereby said cycle-commencing condition is established, and manually operable means for causing the two lugs to clear each other for the purpose of establishing a starting point for said other lug in any of said devices such that a desired delay period will precede the fixed time intervals to be periodically measured.

6. An intervalometer for periodically initiating the performance of a certain function, comprising a rotatable member carrying two cams for opening and closing independent electrical contacts, a motor for driving said member at a constant rate, a switch for starting the motor, two wheels coaxially mounted with respect to said rotatable member, one of said wheels being a ratchet wheel and the other an orientable but normally stationary gear, a pawl mechanism operable by one of said cams to engage said ratchet wheel for progressive advancement thereof at the rate of one tooth per revolution of the cam, self-resetting means cooperative with the other of said cams to release said ratchet wheel when it has been advanced to a limiting position of orientation, a spring for restoring said ratchet wheel to a homing position, a lug mounted on each wheel, the two lugs having a common orbital path, means for settably orienting said gear wheel and its lug for establishing said homing position where the two lugs are in abutment, and means operable to withdraw one lug from the orbit of the other and then to move said ratchet wheel retrogressively to a selected point of orientation from which, upon starting the motor, an added number of pawl actuations will be made for measuring an initial time interval which is to precede the first performance of said function.

7. An intervalometer according to claim 6, wherein the switch contacts are operable to produce a change in circuit connections under control of said other cam upon its first revolution subsequent to the arrival of said ratchet wheel at said limiting position.

ALLEN A. WALSH.
GRANVILLE C. PEERS.

REFERENCES CITED

The following references are of record in the file of this patent:

UNITED STATES PATENTS

| Number | Name | Date |
|---|---|---|
| 1,764,066 | Chamberlin | June 17, 1930 |
| 1,944,055 | Arden | Jan. 16, 1934 |